UNITED STATES PATENT OFFICE.

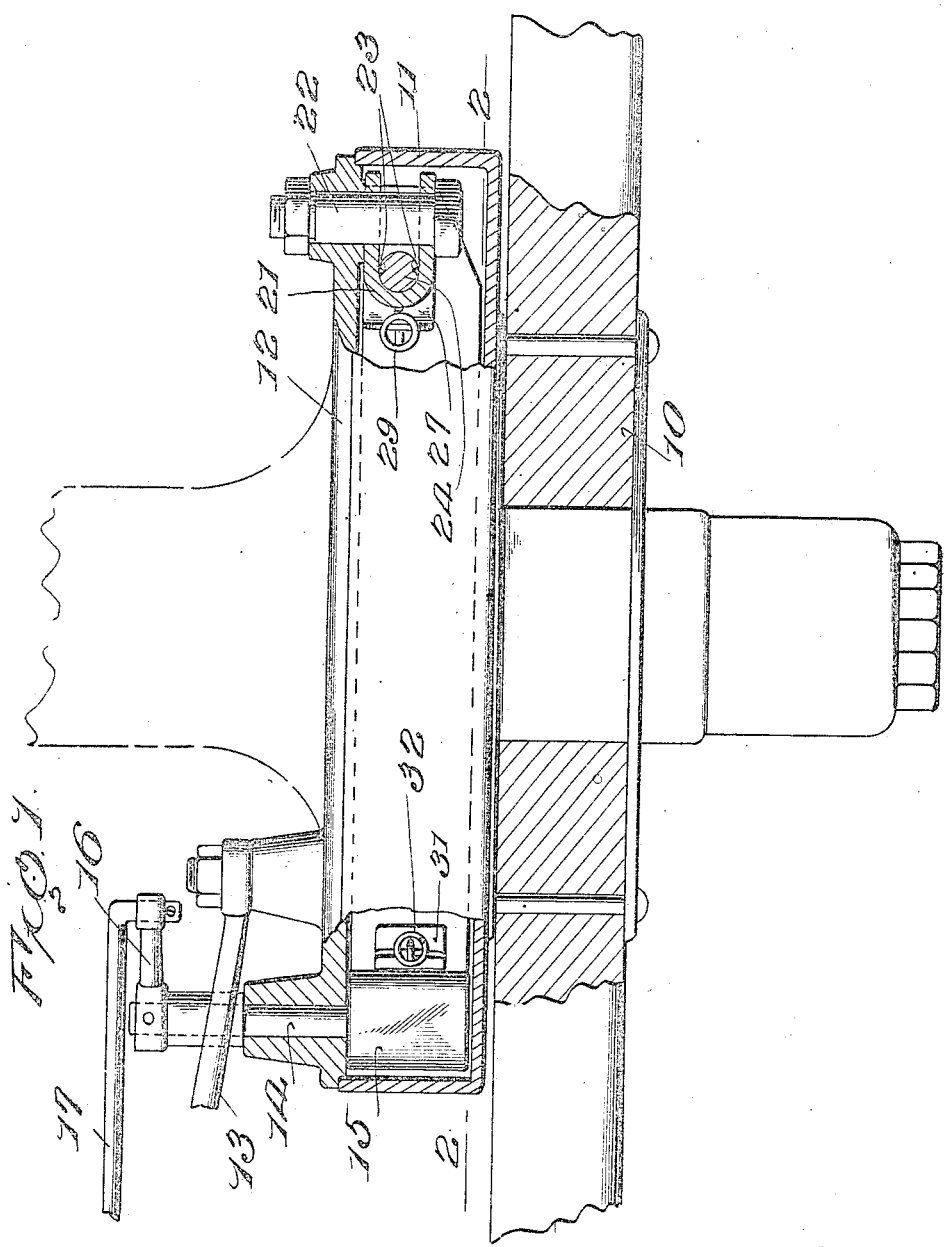

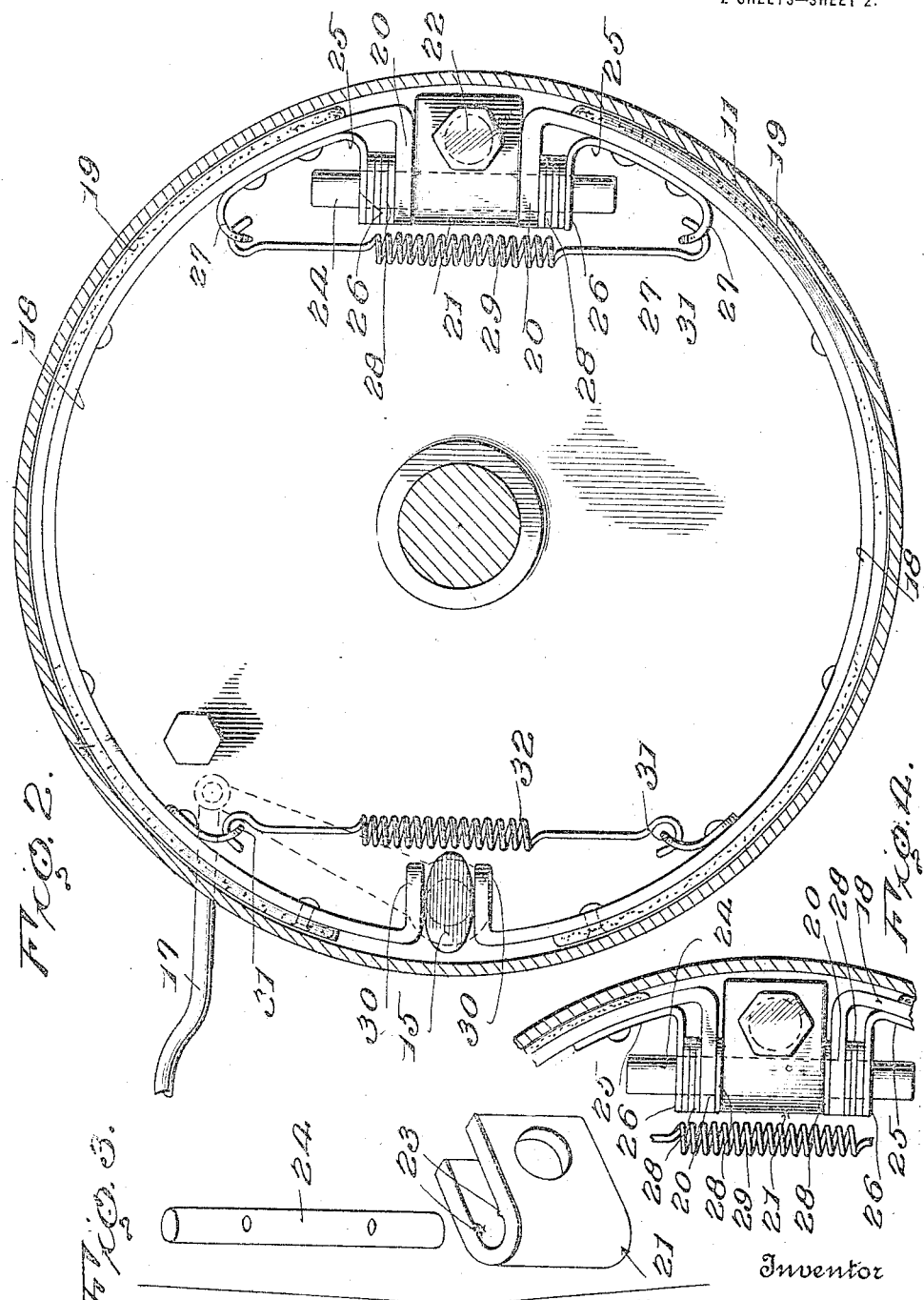

JOSEPH O. MICHAUD, OF FORT KENT, MAINE.

INTERNAL EXPANDING BRAKE.

1,294,512.　　　　Specification of Letters Patent.　　Patented Feb. 18, 1919.

Application filed June 24, 1918. Serial No. 241,339.

*To all whom it may concern:*

Be it known that I, JOSEPH O. MICHAUD, a citizen of the United States, residing at Fort Kent, in the county of Aroostook and State of Maine, have invented certain new and useful Improvements in Internal Expanding Brakes, of which the following is a specification.

This invention relates to an improved internal expanding brake for motor vehicles and has as its primary object to provide a construction employing companion brake shoes which may be readily adjusted, as found necessary, for taking up wear in the brake linings.

The invention has as a further object to provide a brake wherein the brake shoes will be mounted upon a common supporting pin therefor and held upon the said pin by a suitable spring connecting the inner ends of the brake shoes.

A still further object of the invention is to provide a brake wherein the inner ends of the brake shoes may be slidably removed from the supporting pin therefor against the tension of the said spring in order that washers or liners may be readily positioned beneath the inner terminals of the shoes for spreading the shoes so as to take up wear in the brake linings.

The invention has as a further object to provide a brake wherein the supporting pin for the brake shoes will be adapted to carry a supply of the washers so that these washers may always be at hand and wherein the brake shoes will be equipped with brackets coöperating with the supporting pin for retaining the supply of washers thereon.

A further object of the invention in this connection is to provide a construction wherein the said brackets will also support the spring connecting the inner ends of the brake shoes.

And the invention has as a still further object to provide a construction wherein the brake shoes will be yieldably connected at their outer ends as well as at their inner ends.

Other and incidental objects will appear as the description proceeds. In the drawings, wherein I have illustrated the preferred embodiment of the invention, and wherein similar reference characters designate corresponding parts throughout the several views:

Figure 1 is a fragmentary plan view showing my improved brake in connection with the brake drum of one rear wheel of a conventional type of motor vehicle, certain of the parts being broken away and shown in section to more clearly illustrate the mounting of the attaching clip for the brake shoes.

Fig. 2 is a sectional view taken on the line 2—2 of Fig. 1 and looking in the direction of the arrows, this view particularly illustrating the mounting of the brake shoes upon the attaching clip therefor, Fig. 3 is a detail perspective view showing the attaching clip and supporting pin detached, and Fig. 4 is a fragmentary sectional view showing the manner in which the brake shoes are adjusted for taking up wear in the brake linings.

Referring now more particularly to the drawings, I have, in order that the construction, mounting and operation of my improved brake may be accurately understood, shown the brake in connection with one rear wheel and brake drum of a conventional type of motor vehicle. The wheel is indicated at 10. Connected with the wheel hub is a brake drum 11. One end of the rear axle housing of the vehicle is shown at 12 and connected with this housing is one of the rear radius rods 13. Journaled through the housing at the forward side thereof is the usual hub brake cam shaft 14 carrying at its inner end a cam 15 within the brake drum. Fixed upon the outer end of said shaft is a crank or lever 16 to which is connected a brake rod 17.

Coming now more particularly to the subject of the present invention, I employ companion substantially semi-circular brake shoes 18 which are preferably formed of suitable resilient metal and, as particularly shown in Fig. 2, are adapted to fit within the brake drum 11. Suitably connected to the outer side faces of the said shoes are brake linings 19 adapted to coöperate with the drum. Formed on the inner ends of the shoes are inwardly directed radial terminals or lugs 20 and fixed to the axle housing between the said terminals is an attaching clip 21 for the brake shoes. This clip is shown in detail in Fig. 3 of the drawings and as there illustrated is preferably formed from a strip of suitable sheet metal bent into substantially U-shape to provide parallel clip arms. Extending loosely through said arms and through the adjacent end of the housing 12 at the rear side thereof, is a bolt or other suitable fastening device 22, securing the clip within the housing. Struck from opposite edges of the clip arms adjacent their inner extremities are lateral spurs 23 and snugly fitting within the bight of the clip is a supporting pin 24 for the brake shoes having indentations receiving the said spurs. This pin, as shown in both Figs. 1 and 2 of the drawings, extends at substantially right angles to the bolt 22 to project beyond the side edges of the clip in chordal relation to the brake shoes and, as will now be clear, the said bolt may be adjusted for binding the clip against the adjacent end of the housing to hold the clip fixed and, at the same time, flexing the arms of the clip to impinge the spurs 23 thereagainst and tightly clamp the pin within the clip. The pin will thus be rigidly held against longitudinal movement with respect to the clip for receiving the terminals 20 of the brake shoes which are loosely fitted upon opposite ends of the said pin. Thus the pin will operatively support the brake shoes at their inner ends.

Connected to the inner end portions of the brake shoes are brackets 25. These brackets are preferably formed from a strip of suitable resilient sheet metal bent to provide arms 26 at the inner ends of the brackets and lugs 27 at the outer ends of the brackets. The intermediate portions of the brackets are curved to fit the inner side faces of the brake shoes and are secured thereto by rivets or other suitable fastening devices so that the bracket arms project radially inwardly from the shoes. As best shown in Fig. 2 of the drawings, the bracket arms 26 are disposed in spaced parallel relation to the terminals 20 of the brake shoes and these arms are formed with suitable openings loosely receiving the ends of the pin 24 therethrough. Removably fitted upon the opposite ends of the pin and interposed between the bracket arms 26 and the terminals, are a plurality of washers or liners 28 held against displacement from the pin by the said bracket arms. The purpose of these washers will presently appear. The lugs 27 of the brackets project beyond the bight of the attaching clip 21 and engaged with the free ends of the said lugs is a helical spring 29 extending between the lugs and formed at its ends with rebent portions or hooks detachably engaging through suitable openings in the lugs. As will be clear, this spring will thus act to yieldably connect the brake shoes at their inner ends and hold the terminals 20 thereof engaged upon the supporting pin 24.

Formed on the brake shoes, at their outer ends, are inwardly directed radial lugs 30 adapted to coöperate with the cam 15 and connected to the adjacent end portions of the shoes are anchoring plates 31. These plates are mounted upon the inner side faces of the shoes to be secured thereto by rivets or other suitable fastening devices and extending between the plates is a helical spring 32 formed at its ends with rebent portions or hooks detachably engaging through suitable openings in the free ends of the plates. Thus, the spring 32 will yieldably connect the brake shoes at their outer ends and act upon the said shoes to hold the lugs 30 thereof engaging against the cam 15. Consequently, when the brake rod 17 is actuated to rock the cam, the cam will act against these lugs for expanding the shoes and shifting the brake linings into engagement with the drum for applying the brake. Upon the release of the brake rod, said spring will, of course, immediately act to retract the shoes.

As will now be observed, the clip 21 will, when the brake linings are new, space the inner ends of the brake shoes apart in such manner that the said linings will properly coöperate with the brake drum. However, the brake linings will, of course, wear away. For taking up such wear, the terminals 20 of the brake shoes may simply be slidably shifted from the ends of the supporting pin 24 against the tension of the spring 29 and one or more of the washers 28 removed from the position shown in Fig. 2 and fitted upon the pin, as shown in detail in Fig. 4, between the said terminals and the clip for spreading the shoes at their inner ends. The purpose of these washers now becomes apparent and, as also shown in Fig. 4, any of the washers not being used between the inner terminals of the shoes and the clip, may be retained upon the pin between the bracket arms 26 and the said terminals, to be held against displacement from the pin by the said arms. I accordingly provide a very simple and effective arrangement for taking up wear in the brake shoes and by employing the clip arms 26 for holding a supply of the washers upon the supporting pin for the shoes, these washers will always be maintained conveniently at hand while, at the same time, the said washers may be removed from the pin with a minimum of difficulty.

Having thus described the invention, what is claimed as new is:

1. An internal expanding brake including companion brake shoes, supporting means for the shoes, means holding the shoes upon said supporting means and adapted to permit the spreading of the shoes whereby liners may be disposed beneath the inner ends of the shoes for maintaining the shoes spread, means carried by the brake shoes to coact with said supporting means and adapted to normally retain a supply of liners inactive upon the said supporting means, and service means for expanding the said shoes.

2. An internal expanding brake including companion brake shoes, means supporting the said shoes, yieldable means connecting the shoes whereby liners may be interposed beneath the inner ends of the shoes for spreading the said shoes, means carried by the shoes to coact with said supporting means and adapted to retain a supply of liners inactive upon the said supporting means, and service means for expanding the said shoes.

3. An internal expanding brake including companion brake shoes, means supporting the said shoes, means holding the shoes upon said supporting means and adapted to permit the spreading of the shoes whereby liners may be interposed beneath the inner ends of the shoes for maintaining the shoes spread, means carried by the shoes to slidably fit over said supporting means and adapted to retain a supply of liners inactive upon the said supporting means, and service means for expanding the said shoes.

4. An internal expanding brake including companion brake shoes, means supporting the said shoes, means carried by the shoes to coact with said supporting means for retaining a supply of liners inactive upon the said supporting means, means carried by said second mentioned means and holding the shoes upon said supporting means, the said last mentioned means being adapted to permit the spreading of the shoes whereby liners may be interposed beneath the inner ends of the shoes for maintaining the shoes spread, and service means for expanding the said shoes.

5. An internal expanding brake including companion brake shoes, means supporting the said shoes, brackets carried by the shoes to coact with said supporting means for retaining a supply of liners inactive upon said supporting means, yieldable means holding the shoes upon said supporting means whereby liners may be interposed beneath the inner ends of the shoes for spreading the shoes, and service means for expanding the said shoes.

6. An internal expanding brake including companion brake shoes, means supporting the said shoes, brackets connected to the shoes and having arms fitting over said supporting means and adapted to retain a supply of liners inactive upon said supporting means, lugs formed on the brackets, yieldable means extending between said lugs and acting to hold the shoes upon said supporting means whereby liners may be interposed beneath the inner ends of the shoes for spreading the shoes, and service means for expanding the said shoes.

7. An internal expanding brake including companion brake shoes, fixed supporting means therefor having the inner ends of the shoes slidably fitted over opposite ends thereof, and yieldable means holding said shoe ends against displacement from the supporting means and adapted to permit the spreading of the shoes upon the supporting means toward the ends thereof.

8. An internal expanding brake including companion brake shoes provided at their inner ends with openings, fixed supporting means having opposite ends thereof slidably received through said openings for supporting the shoes, and yieldable means for holding the shoes against displacement from the supporting means and adapted to permit the spreading of the shoes upon the supporting means toward the ends thereof.

9. An internal expanding brake including companion brake shoes, supporting means therefor, liners normally carried inactive upon the supporting means, and means carried by the brake shoes and holding the liners against displacement from the supporting means, the liners being insertible beneath the inner ends of the shoes for spreading the shoes.

10. An internal expanding brake including companion brake shoes, supporting means therefor, liners normally carried inactive upon the supporting means, and means carried by the brake shoes and engaging over the ends of the supporting means for holding the liners against displacement therefrom, the liners being insertible beneath the inner ends of the shoes for spreading the shoes.

In testimony whereof I affix my signature.

JOSEPH O. MICHAUD. [L. S.]